(12) United States Patent
Aksell

(10) Patent No.: US 10,465,988 B2
(45) Date of Patent: Nov. 5, 2019

(54) THERMAL ACCLIMATOR AND HEAT EXCHANGER

(71) Applicant: Wesley J. Aksell, Orlando, FL (US)

(72) Inventor: Wesley J. Aksell, Orlando, FL (US)

( * ) Notice: Subject to any disclaimer, the term of this patent is extended or adjusted under 35 U.S.C. 154(b) by 0 days.

(21) Appl. No.: 16/221,551

(22) Filed: Dec. 16, 2018

(65) Prior Publication Data

US 2019/0120558 A1   Apr. 25, 2019

(51) Int. Cl.
*F28D 7/02* (2006.01)
*F25D 23/12* (2006.01)

(52) U.S. Cl.
CPC ............ *F28D 7/022* (2013.01); *F25D 23/126* (2013.01)

(58) Field of Classification Search
CPC ............ F28D 20/0034; F28D 20/0039; F28D 20/0043; F28F 9/013
USPC ................................ 165/73, 74, 82, 162, 163
See application file for complete search history.

(56) References Cited

U.S. PATENT DOCUMENTS

| | | | |
|---|---|---|---|
| 46,476 A * | 2/1865 | Knapp | F01P 11/0295 165/73 |
| 792,506 A * | 6/1905 | Doyle | A01J 9/04 165/74 |
| 1,672,837 A | 6/1928 | Whittier | |
| 1,817,978 A * | 8/1931 | Feldmeier | A01J 9/04 126/343.5 A |
| 2,477,210 A | 7/1949 | Skinner | |
| 2,797,069 A * | 6/1957 | Layton | F24D 3/00 165/163 |
| 3,739,842 A | 6/1973 | Whalen | |
| 4,061,184 A | 12/1977 | Radcliff | |
| 4,201,264 A * | 5/1980 | Platt | F24H 1/208 162/162 |
| 4,320,798 A * | 3/1982 | Obernberger | F01P 3/207 123/41.09 |
| 4,448,237 A | 5/1984 | Riley | |
| 5,975,192 A | 11/1999 | Moratalla et al. | |
| 7,117,685 B2 | 10/2006 | Wetherbee | |
| 8,511,368 B2 | 8/2013 | Hardin et al. | |
| 2006/0021745 A1 | 2/2006 | Fritze et al. | |

* cited by examiner

*Primary Examiner* — Allen J Flanigan
(74) *Attorney, Agent, or Firm* — John V. Stewart

(57) ABSTRACT

An apparatus with a thermal reservoir liquid that acclimates to room temperature in a building over time. A heat exchange conduit routes tap water through the reservoir liquid, cooling or warming the tap water on demand relative to water that is respectively heated or chilled in attic or exterior wall pipes by weather conditions. This provides a flow of water from a cold water tap that is tolerable for hand washing and is better for delicate clothes washing than either hot or frigid water from the supply pipes, and is done without powered refrigeration or heating. The thermal reservoir liquid is contained in a tub that can be made of a material with at least 10 or 1000 times lower thermal conductivity than that of the conduit, enabling fabrication of the container from plastic or other low-cost material.

14 Claims, 2 Drawing Sheets

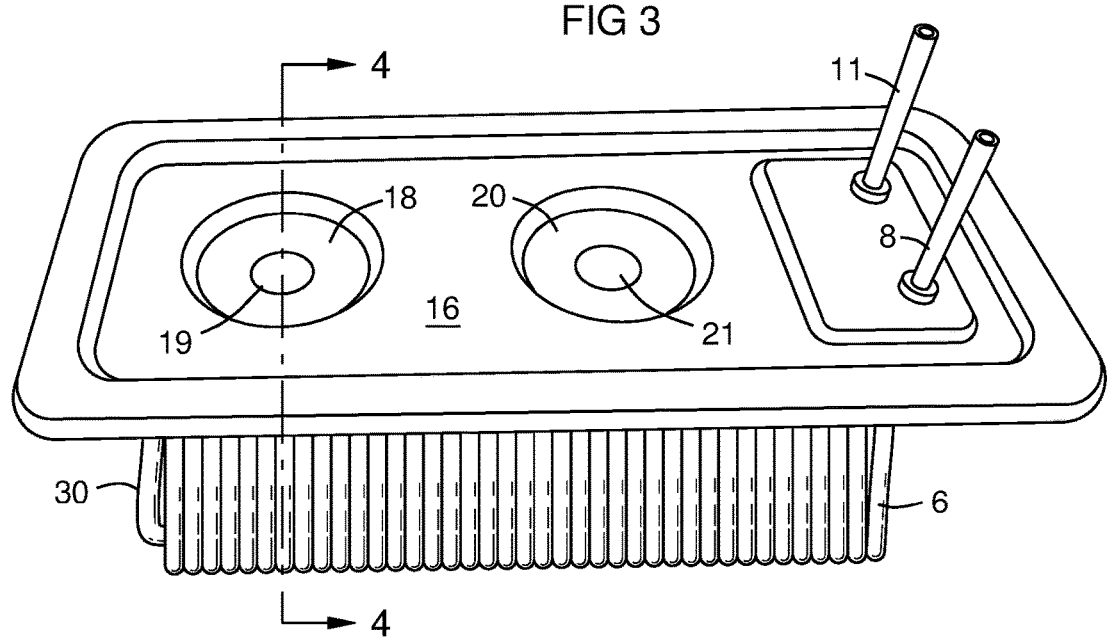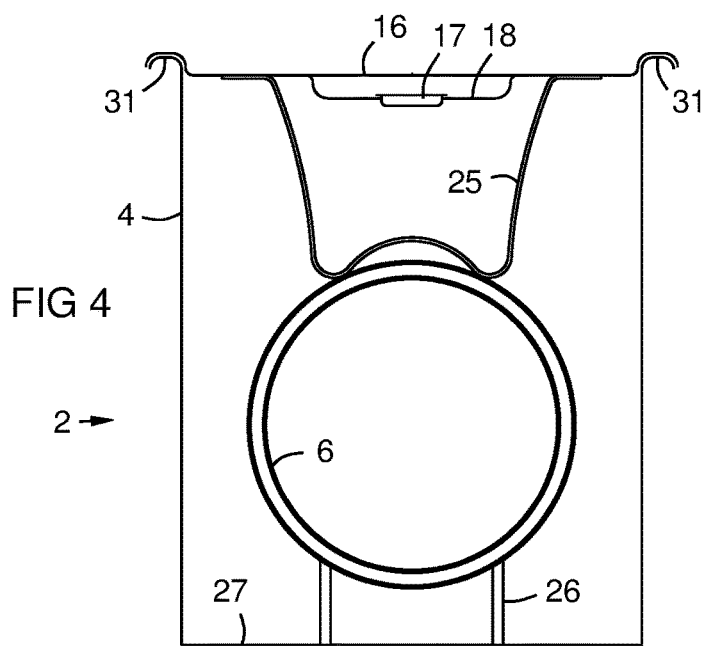

THERMAL ACCLIMATOR AND HEAT EXCHANGER

FIELD OF THE INVENTION

This invention relates to an unpowered water cooling device with a thermal energy storage unit that acclimates to room temperature and a heat exchanger.

BACKGROUND OF THE INVENTION

Water is supplied to homes by pipes that run underground, where the temperature is relatively cool and constant. From there, pipes are routed through the floor and up the walls to the fixtures. Alternately, the pipes can run through the attic instead of the floor. This is often done when re-piping a home to replace old leaky pipes, since running replacement pipes through an attic is easier than through the floor. Running new pipes through an existing concrete floor slab is impractical.

On hot days, the attic heats attic pipes. Cold water faucets then produce hot water until the heated water in the attic pipes runs out. This water can be so hot that it is unsafe, unsuitable, or uncomfortable for cold tap water uses, such as washing hands and delicate clothing. Insulating the pipes gives little benefit because water in the pipes is usually stationary, so it absorbs heat gradually through the insulation until it reaches the attic temperature. Installing a radiant barrier in the roof or attic is expensive and only partly effective. A user can run the cold water until the hot water from the attic pipes runs out, but this wastes water and time.

SUMMARY OF THE INVENTION

An objective of the invention is to cool hot attic water on demand as it flows to the cold faucet, and to do this without power or any moving parts except the flow of water being cooled. Another objective is an apparatus small enough to fit in a kitchen sink cabinet through a door of the cabinet. Another objective is economic feasibility.

BRIEF DESCRIPTION OF THE DRAWINGS

The invention is explained in the following description in view of the drawings that show:

FIG. 3 is a top perspective view of a lid for the reservoir container.

FIG. 4 is a sectional view taken on line 4-4 of FIG. 3.

GLOSSARY

"Acclimator" herein means an apparatus with a thermal energy reservoir that maintains or approaches an ambient temperature over time without power.

"Serpentine" herein means in the shape of a winding curve or line, and includes helical and other progressing coils as well as other winding shapes.

DETAILED DESCRIPTION OF THE INVENTION

Figure 1:
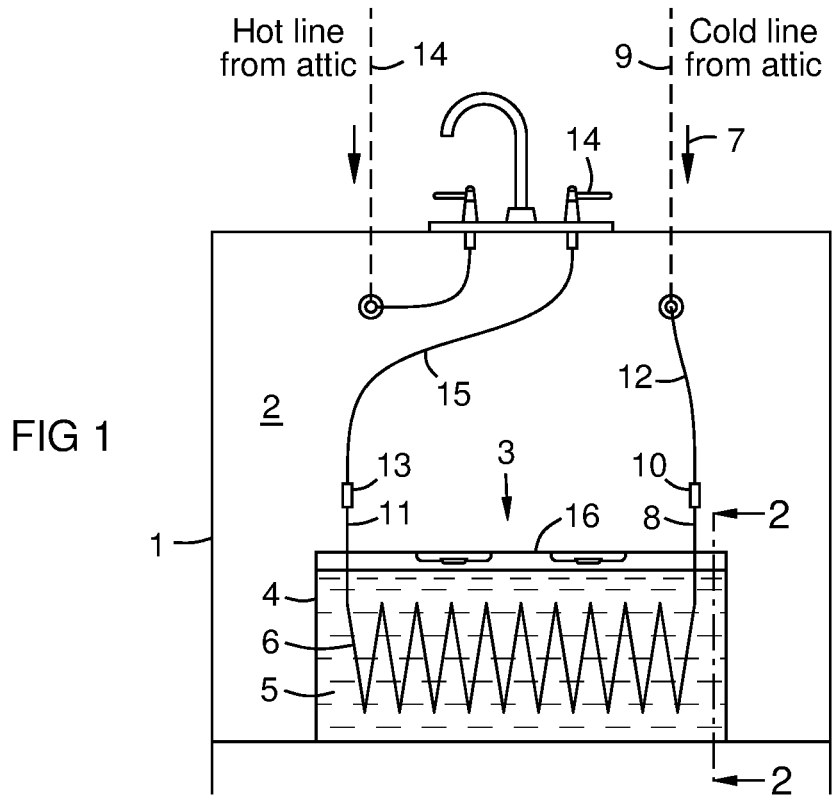
FIG. 1 is a schematic front view of the invention installed in a sink cabinet.

FIG. 1 shows an acclimation and heat exchange apparatus 3 according to aspects of the invention as installed in a sink cabinet 1 with ambient air 2. The ambient air may have a room temperature, including at least 70-78 F. A thermal reservoir is comprised of a first liquid 5 enclosed in a container 4 with walls that enable conductive heat transfer between the ambient air and the reservoir liquid 5. This allows the liquid 5 to approach the ambient air temperature over time. A heat exchange conduit 6 routes tap water from the cold water line 9 through the reservoir liquid 5. An inlet portion 8 of the conduit extends outside the container 4 through the lid 16 or otherwise. It can be connected to the cold water pipe 9 via a short tube 12 and a coupler 10. An outlet portion 11 of the conduit extends outside the container 4 through the lid or otherwise. It can be connected to the cold water faucet 14 via a short tube 15 and a coupler 13. The conduit 6 has walls that facilitate heat exchange between the drinking water and the reservoir liquid. Thermal conductivity of the conduit material should be relatively high. For example, the conduit may be copper tubing in a helical coil or other serpentine shape to maximize the liquid contact surfaces. Copper has thermal conductivity of about 400 W/(m·K).

The reservoir liquid 5 only receives heat from the heat exchange coil 6 occasionally and briefly. Most of the time it is acclimating to the ambient temperature. For this reason the heat transfer rate through the container walls 4 need not be high. Plastic can be used for these walls even though thermal conductivity of plastic is relatively low. A prototype of the container has acrylic walls 0.25" thick and holds 5 gallons of water. Thermal conductivity of acrylic is about 0.20 W/(m·K). The prototype has a heat exchange conduit 6 of copper tubing with ⅜" outer diameter, 50' long, and tightly coiled helically. The outer dimensions of the prototype container 4 are approximately: height 9", depth 9", and width 19" (to fit in a 20" wide cabinet). These dimensions are for example only, and are not limiting.

Figure 2:
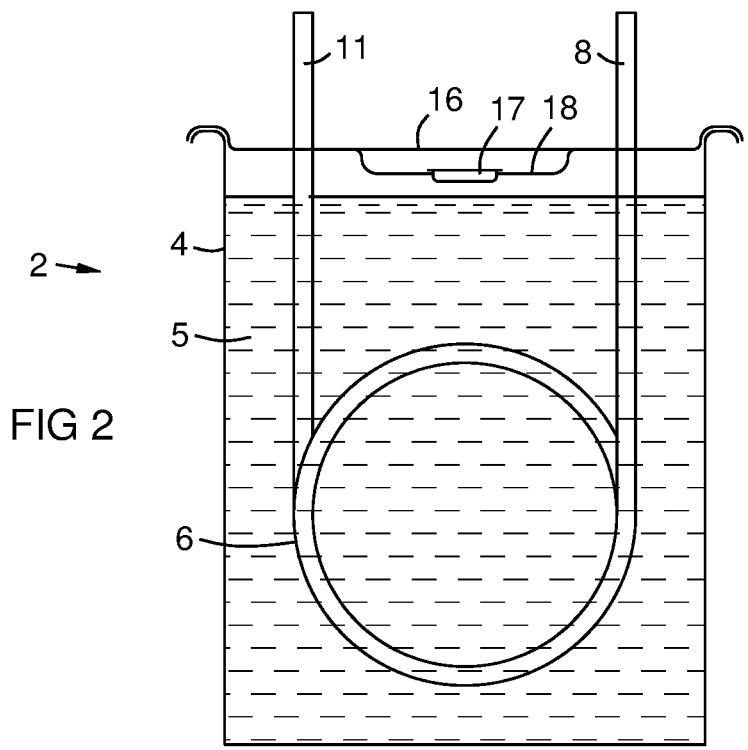
FIG. 2 is a schematic view taken on line 2-2 of FIG. 1.

FIG. 2 shows a side schematic view of the container 4 and coil 6 taken on line 2-2 of FIG. 1. A fill hole and cap 17 may be disposed in a depression 18 in the lid 16 to avoid overfilling the container 4 as later described.

Following is a test result using the prototype.
Outside temperature 91° F.
Attic air temperature 114° F.
Inside air-conditioned temperature 78° F.
Water temperature in ground pipes 82° F. measured at house inlet
Water temperature from kitchen cold water faucet versus time from opening faucet:

| Stage | Min. after opening tap | Water Temp ° F. |
|---|---|---|
| 1. | 0.0 | 78° |
| 2. | 0.5 | 86° |
| 3. | 1.0 | 93° |
| 4. | 1.5 | 86° |
| 5. | 2.0 | 84° |
| 6. | 3.0 | 82° |

Stage 1. Water from the copper coil runs out at room temperature.
Stage 2. Water from the near-wall water pipe flows out.
Stage 3. Water from the attic flows out.
Stage 4. Water from an exterior far-wall pipe flows out.
Stage 5. Water from ground pipes has reached the faucet.

In this test the acclimator and heat exchanger absorbed enough of the 114-degree attic heat to reduce the tap water to a tolerable temperature. This is just an example of results, which will vary with installation, outside temperature, sun/roof exposure, and water pressure. Attic heat can exceed 120° F., presenting a scalding hazard. If the near wall is an interior wall, the near-wall part of the flow will be closer to room temperature.

FIG. 3 shows a lid 16 of the thermal reservoir container with a fill hole 19 in the lid. A funnel can be placed in this hole 19 for filling the container with water or other liquid. A second opening 21 may be provided in the lid for viewing the water level in the container 4 as it is being filled to avoid overflowing. Each hole 19, 21 may be disposed in a depressed portion or in respective depressed portions 18, 20 of the lid below a lip 31 (FIG. 4) of the container to avoid overflowing the container when filling. The depressed portion(s) may be limited in size and position as shown so as not to reach the walls 4 of the container. This provides an air space above the reservoir liquid to prevent capillary action from raising it upward into the lip 31 (FIG. 4). As shown, the conduit outlet 11 may optionally be routed 30 through the coil 6 to the inlet end of the coil or vice versa, so the inlet 8 and outlet 11 extend beside each other at the same end of the container.

FIG. 4 is a view taken on line 4-4 of FIG. 3 with the container 4 added to the view. A flexible brace 25 may extend downward from the lid 16 to physically stabilize the conduit 6. This brace may be perforated and/or otherwise limited in contact with the coil to allow convection above the conduit 6. Flexibility of this brace accommodates fabrication tolerances and thermal expansion and contraction of the conduit. Support braces 26 may extend upward from the bottom of the container to support and center the conduit in the container 4, again providing space around the conduit for convection.

Variations in apparatus dimensions are possible. For example, instead of a 50-foot tight helical coil as in the prototype, the conduit may be 25-40' long, and loosely helically coiled with space for convection of the liquid 5 between each winding.

The inventor recognized that cooling the water heated by the attic as it flows to a cold water faucet only requires a small amount of water to be cooled at a given time, and this can be done with a non-powered room-temperature thermal storage unit, or acclimator, with a heat exchanger. The apparatus also warms water that has been chilled by frigid outside temperatures. It provides tolerable temperatures for hand washing and a better temperature for cold water clothes washing. It is based on a thermal reservoir 5 that acclimates to room temperature, then exchanges heat with the flowing tap water on demand. An ideal liquid for the reservoir liquid 5 is water, since it has a relatively high volumetric heat capacity of about 4.18 J/(cm³·K). The container 4 can be small enough to easily slide into a kitchen or bathroom sink cabinet. The invention can alternately or additionally be used to thermally moderate water for a water-using appliance, for example a clothes washer or an ice maker.

The inventor recognized that the thermal conductivity of the material of the container 4 and lid 16 can be at least 10 or 100 or 1000 times less than that of the conduit 6, even though the container and lid are also heat-exchange walls. This allows the container and lid to be made of low-cost materials, for example plastic without thermal conductivity enhancements such as metal particle inclusions. Copper has a thermal conductivity over 2000 times greater than acrylic or acrylonitrile butadiene styrene (ABS) plastic. Yet these plastics are suitable for the container walls, making manufacture economical.

While various embodiments of the present invention have been shown and described herein, such embodiments are provided by way of example only. Variations and substitutions may be made by those skilled in the art without departing from the invention herein. Accordingly, the invention is to be limited only by the scope and intended meaning of the appended claims.

The invention claimed is:

1. An apparatus comprising:
    a container for a liquid;
    a thermal reservoir liquid in the container that acclimates to a room temperature in a building over time by heat exchange between ambient air in the building and the thermal reservoir liquid through walls of the container; and
    a heat exchange conduit that routes tap water through the reservoir liquid, and cools or heats the tap water from a temperature of the tap water that is respectively above or below the room temperature when received at a tap water inlet of the conduit;
    wherein the cooling or heating of the tap water is by exchange of heat between the thermal reservoir liquid and the tap water through walls of the conduit;
    wherein the container comprises a tub with an upper lip and a lid thereon, the lid comprising a first fill hole for filling the tub with the thermal reservoir liquid, the first fill hole being disposed in a depressed portion of the lid that is below the upper lip of the container and does not reach the walls of the container.

2. The apparatus of claim 1 wherein the acclimation of the thermal reservoir liquid, and the cooling or heating of the tap water, are done without powered refrigeration or heating.

3. The apparatus of claim 1 wherein the lid further comprises a second fill hole disposed in a depressed portion of the lid that is below the upper lip of the container and does not reach the walls of the container.

4. The apparatus of claim 1 wherein the conduit comprises a helical coil attached to the lid by inlet and outlet ends of the conduit extending upward through the lid.

5. The apparatus of claim 4 wherein one of the ends of the helical coil is routed through or beside the coil to an opposite end of the coil, and both ends of the coil extend upward through the lid beside each other on a same end of the lid.

6. The apparatus of claim 4 further comprising a brace extending downward from the lid and contacting a length of the coil, wherein the brace retains and stabilizes the coil at a predetermined position within the container, and accommodates thermal expansion and contraction of the coil.

7. The apparatus of claim 6 further comprising one or more support braces extending upward from a bottom of the container that support the coil at the predetermined position within the container, wherein the brace and the one or more support braces provide space around the coil that facilitates convection of the thermal reservoir liquid about the coil.

8. The apparatus of claim 1 wherein the conduit is made of a material with at least 10 times greater thermal conductivity than a material of the container.

9. The apparatus of claim 1 wherein the conduit is made of a material with at least 1000 times greater thermal conductivity than a material of the container.

10. The apparatus of claim 9 wherein the coil is made of metal and the container is made of plastic.

11. An apparatus comprising:
    a container for a first liquid, the container comprising exterior walls that conductively exchange heat between the first liquid and ambient air;

a conduit for a second liquid passing through the first liquid, the conduit comprising walls that conductively exchange heat between the second liquid and the first liquid without powered refrigeration or heating;

the conduit comprising an inlet connected to a cold water supply line, and an outlet connected to a water tap or a water-using appliance;

wherein the container comprises a tub with an upper lip and a lid thereon, the lid comprising a fill hole for filling the tub with the thermal reservoir liquid, the fill hole being disposed in a depressed portion of the lid that is below the upper lip of the container and does not reach the walls of the container.

12. An apparatus comprising:

a first liquid in a container that exchanges heat with an ambient air around the container, wherein the temperature of the first liquid approaches the temperature of the ambient air by heat exchange through walls of the container over a period of time without the use of power; and a conduit passing through the heat reservoir that exchanges heat with the first liquid without the use of power;

wherein the conduit comprises an inlet and an outlet outside the heat reservoir for transmission of a second liquid through the conduit;

wherein the container comprises a tub with an upper lip and a lid thereon, the lid comprising a fill hole for filling the tub with the thermal reservoir liquid, the fill hole being disposed in a depressed portion of the lid that is below the upper lip of the container and does not reach the walls of the container.

13. The apparatus of claim 12 wherein the conduit is made of a material with at least 10 times greater thermal conductivity than a material of the container.

14. The apparatus of claim 12 wherein the conduit is made of a material with at least 1000 times greater thermal conductivity than a material of the container.

* * * * *